May 28, 1935.  K. MÜLLER ET AL  2,002,546

ELECTRIC MOTOR AND CONTROL THEREFOR

Filed June 16, 1932    8 Sheets-Sheet 1

Konrad Müller
Fritz Döring and
Josef Wartock
Inventors.
By Chas. M. Candy
Atty.

Patented May 28, 1935

2,002,546

UNITED STATES PATENT OFFICE 2,002,546

ELECTRIC MOTOR AND CONTROL THEREFOR

Konrad Müller, Berlin-Siemensstadt, and Fritz Döring, Berlin-Frohnau, and Josef Wantosch, Berlin-Reinickendorf-O, Germany, assignors to Siemens & Halske Aktiengesellschaft, Berlin-Siemensstadt, Germany, a German company Application June 16, 1932, Serial No. 617,658
In Germany June 18, 1931

8 Claims. (Cl. 172—36)

The present invention relates to a device driven by an electric motor used particularly as driving means for apparatus employed in telephone systems, such as for example switches, signalling machines, etc.

It has already been suggested to use motors for operating switches in telephone systems in which case three fixed electromagnets set at an angle of 120° have functioned as stators, said magnets being energized by alternating current and the armature being provided with a winding energized by direct current. In order to bring the rotating armature to rest rapidly it is necessary in this arrangement to energize the stator coils by direct current after the alternating current has been cut off, resulting in the rapid stopping of the armature under the influence of the field set up. Apart from the fact that the switching operations necessary to bring about the stopping of the rotor in this arrangement take a considerable time, the expense for relays or other switching devices required is considerable. Driving means have also been suggested of a type likewise provided with fixed electromagnets which, due to their intermittent energization, cause an armature in front of the poles to rotate, the stator coils in such a case being intermittently energized by the switching means controlled by the movable members of the drive. This type of motor is stopped by maintaining one or more coils of the driving means energized for an extended period with the aid of the direct current utilized to operate the driving means.

In contrast to the devices mentioned above a feature of the present invention consists in energizing the coils by alternating current or, alternatively, pulsating direct current, and causing the said coils to influence the non-energized rotating member. In order to ensure that the driving means are reliably stopped in quite definite positions the device may be provided with auxiliary windings energized by direct current which are arranged in the form of second windings either direct on the stationary magnets or on special auxiliary poles fitted between the stationary stator coils. The magnetic field generated by the auxiliary coils can either be caused to influence the rotating members in turn influenced by the stator coils or the said auxiliary windings may be provided with a special auxiliary armature suitably coupled to the main armature.

A further object of the invention is to obtain a more reliable operation of the motor driven switch. In order to gain a satisfactory operation of such switches it has been suggested to reduce the setting speed by means of series resistances or the like during the setting operation so as to cause the individual line testing operation to be more reliably carried out. The proposed arrangement, however, entails the drawback that a reliable operation cannot be ensured if the setting speed is reduced.

The invention eliminates this drawback by providing the device driven by an electric motor with short circuit windings, for example a copper slug, metal washers, wire windings, which influence the magnetic fields set up by the energizing windings.

A more powerful magnetic force is available at all critical moments in the operation such as for example for start, stopping, contact actuation, etc., by means of the short circuit windings provided. A switch fitted with such a driving means starts rapidly but can also be brought to rest in a very short space of time.

The short circuit winding may take any desired shape or form. It may consist of, for example, a copper slug, metal washers, wire windings or the like and may be made interchangeable. This is of special advantage if the switch for some reason or other is to operate with greater speed since the available magnetic force naturally is reduced to a certain extent by the short circuit windings when a definite setting speed is exceeded. Steps, however, can be taken to the effect that the short circuit windings are automatically connected up when their effect upon the magnetic field is required.

If the driving means provided with short circuit windings are to actuate the switches with the same setting speeds as driving means without such windings, this may be achieved by means and devices known per se such as reducing the resistance of the circuit for the energizing windings, increasing the number of ampere turns or by both these methods.

The operation of the device driven by the electric motor is made still more reliable by designing the switching means which control the stationary electromagnets and which are influenced by the rotating members of the motor so that the succeeding electromagnet in the direction of movement is energized before the preceding magnet has been de-energized. At least one coil is energized at any desired moment during the rotation on the part of the movable members when the switching means are so designed. Both the coils are energized during the switching over from one coil to another for a period corresponding to an angle of lap of 5–10°.

By means of this leading the time necessary for the energization and dispersal of the magnetic field due to self-induction of the magnets is saved, and furthermore, the motor can be caused to run at a greater speed. Varying the leading constitutes a convenient means for regulating or adjusting the speed.

If it should be required to set the apparatus operated by the above mentioned device running in opposite direction this according to the invention may be accomplished by means of switching devices varying the energization sequence in the stationary electromagnets of the driving device. An exceedingly rapid reversal of the direction of rotation is possible if the switching-over devices which control the sequence in which the electromagnets are energized interact with switching means influencing the rotating members of the motor in which case the lap angle for the movement of the armature is larger than the angle determined by the number of electromagnets while one or a group of electromagnets are energized.

That a reliable operation is obtained depends to a very considerable extent upon the fact that the rotating members of the driving device can be stopped as soon as the stopping is initiated. A very small additional movement causes a faulty setting in the apparatus, for example, the switch provided with the driving device. According to a feature of the invention an apparatus is reliably stopped by switching means, actuated when the stopping is initiated, which energize the stationary electromagnets nearest to a pole of the armature over contacts controlled by the rotating members of the driving device.

The various features of the invention will be better understood from the following detailed description which should be taken in conjunction with the accompanying drawings.

Referring now to the drawings.

Figure 1:
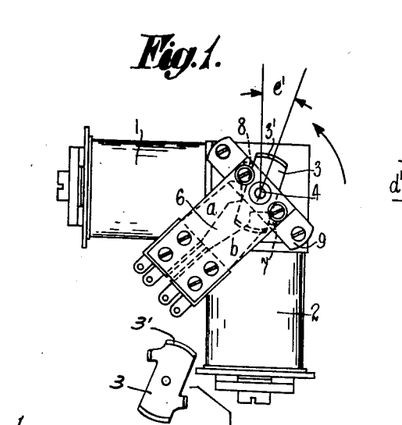
Fig. 1 shows a plan of a driving motor provided with two stator coils and fitted with switching means actuated by the rotating members of the motor.
Figures 3, 4:
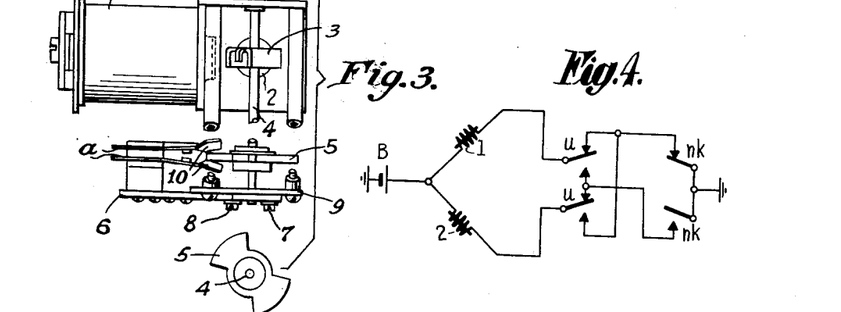
Fig. 3 shows a partial view of the contact and armature arrangement seen from above.
Figs. 4, 5 and 6 represent embodiments showing the manner in which the driving device is started and reversed.

The driving device shown in Fig. 1 comprises the two stator coils 1 and 2, the poles of which influence the armature 3 which in turn is mounted on the shaft 4. The shaft 4, in addition, carries the cam face 5 which actuates the set of contact springs $a$ and $b$. These contact springs $a$ and $b$ are arranged on an arm 6 adapted to move within certain limits and fixed to the traverse (beam) 9 by means of two screws 7 and 8. The traverse 9 at the same time serves as a bearing for the armature shaft 4. The manner in which the contact springs $a$ and $b$ are actuated is shown in Fig. 3. The armature shaft 4 carries the cam face 5 of insulating material which separates, for example, the set of springs $a$ due to portions of the cam face 5 alternately passing through the correspondingly bent ends 10 of the set of springs $a$. Fig. 3 shows the manner in which armature 3 and cam 5 are mounted on shaft 4 and also shows the shape of cam 5 and armature 3 with the supporting screws of the plate 9 broken away to more clearly illustrate the arrangement.

Figure 2:
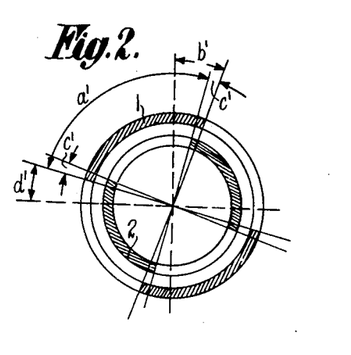
Fig. 2 shows a diagram in which the sequence of energization of the two stator coils will be seen.

The sequence of energization of the stator coils 1 and 2 is seen in the diagram shown in Fig. 2 in which the shaded portions on the outer ring 1 indicate the energization of the stator coil 1 whereas the shaded portions of the inner ring 2 indicate the energization of the stator coil 2. From this figure will be seen that the two energizations overlap to a definite angle $c'$ (about 5°) with the result that during this period both the stator coils are energized simultaneously. Thereby is achieved that the rotary effect on the armature never has a zero value. The diagram also shows the extent of the lead. It will be assumed that the armature rotates in the direction of the arrow as shown in Fig. 1. The stator coil 1 is not energized when the armature takes up an angle of 90° relative to the axis of the coil but earlier, i. e. at an angle represented in Fig. 2 by $b'$. Similarly this stator coil 1 is not de-energized when the armature pole 3' is set exactly opposite the centre of the stator coil 1 but earlier, i. e. corresponding to a definite angle $d'$ (about 5–10°). By means of this lead, on the one hand, the time required for the energization and dispersal of the magnetic field due to self-induction of the magnets is saved and consequently an increased speed of the motor can be obtained, and on the other hand, the speed may be varied at any time by altering the lead. By combining the above mentioned operations it is achieved that the motor has a sufficient rotary momentum in any position of the armature and consequently a reliable start is ensured.

Figure 5:
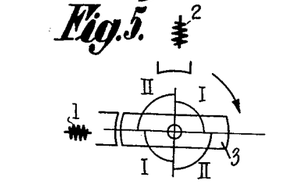
Figure 6:
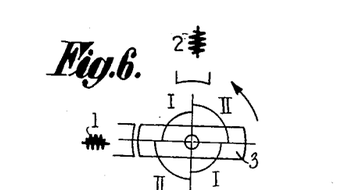

Figures 4, 5 and 6 show in which manner the motor shown in Fig. 1 can be caused to run in normal as well as in reverse. The normal and reverse rotation is controlled by the sequence in which the coils 1 and 2 are energized, the polarity of the electromagnets being immaterial. Fig. 5 shows a diagram for clockwise movement and Fig. 6 such a diagram for an anti-clockwise rotation. The direction of rotation is indicated by arrows while the arcs of energization of the windings 1 and 2 are indicated by the roman numerals corresponding to the windings. If, for example, the armature of the motor is set between the poles of the electromagnets 1 and 2, the coil 2 is energized first if the motor is to run in normal (Fig. 5), the coil 1 being energized first if the motor is to run in reverse. By means of an arrangement of the poles known per se and not shown in Figs. 5 and 6, the armature 3, when the motor is at rest, can be so set that it is not placed opposite either of the two poles but in an intermediate position so as to ensure a reliable start on the part of the armature. Fig. 4 shows a circuit for carrying out the control method shown in Figs. 1 and 2. The reference letters $nk$ represent the cam contacts (contact springs $a$ and $b$, Fig. 1) controlled by the armature 3. Switch contacts $u$ for changing the direction of rotation are provided which consist, for example, of relay contacts arranged apart from the motor. When the contacts are set in the position shown, the stator coil 1 is first energized over: earth, $nk$-contact, $u$-contact, coil 1, battery B, earth. When the armature has revolved a definite distance, the lower $nk$-contact is closed with the result that the coil 2 is energized over: earth, lower $nk$-contact, lower $u$-contact, coil 2, battery, earth. This operation is repeated indefinitely and causes the motor to run in reverse. When the contacts $u$ are thrown over after the motor has been disconnected, the coil 2 is first energized when connected to battery and then the coil 1. The motor consequently runs with a right hand rotation (see Fig. 5).

Figure 7:
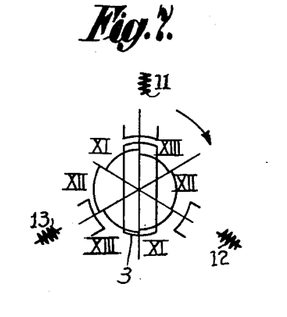
Figs. 7, 8 and 9 illustrate corresponding diagrams as well as the circuit for a motor provided with three stator coils.
Figure 8:
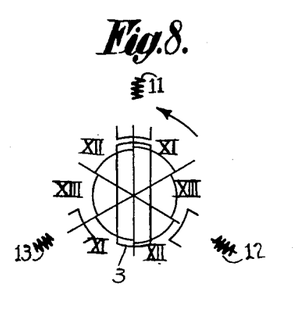
Figure 9:
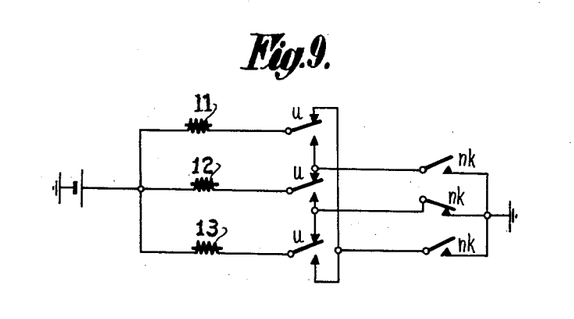

Figs. 7, 8 and 9 show the corresponding circuits for a motor having three coils. Also in this case the direction of the rotation of the motor is controlled by switch contacts apart from the motor, the sequence in which the coils 11, 12 and 13 are energized being variable.

Figure 10:
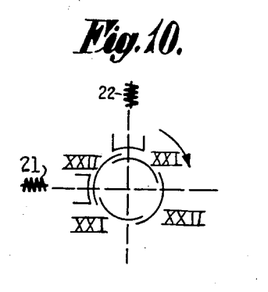
Figs. 10, 11 and 12 show a circuit for an arrangement in which a contact device is provided for the normal rotation and one for the reverse rotation.
Figure 11:
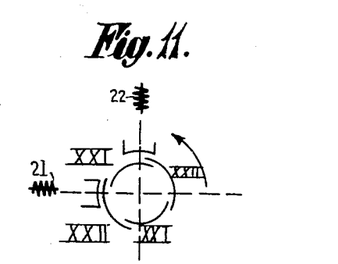
Figure 12:
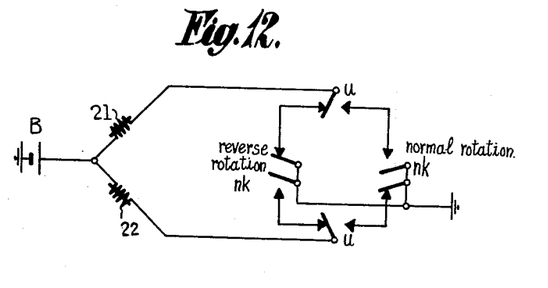

In the motors shown in Figs. 5, 6, 7 and 8 described above, the switching over from coil to coil always occurs when the armature is exactly opposite the pole. In order to cause the motor to run rapidly and evenly, however, it is necessary to provide the switching over with a definite lead (for example 10°) and thus energize the two coils simultaneously for a short period in the manner described in detail above in conjunction with Fig. 2. For this reason it is necessary to use a contact device for each direction of rotation in motors adapted to rotate in either direction. The operation of such an arrangement is shown in Figs. 10, 11 and 12 and used for motors with two poles. The coil 22 (Fig. 10) then is not energized when the armature is set in the longitudinal dimension of the stator coil 21, that is to say, has been displaced 90° in relation to the longitudinal dimension of said stator coil but at a definite angle lap earlier and, furthermore, the coil 22 is not de-energized when the armature is located opposite the centre of the stator coil 22 but at a definite angle lap earlier. In the circuit shown in Fig. 12 the two $u$-contacts are in a position which causes the motor to run in reverse and Fig. 11 shows the associated contact diagram for this operation. When the motor is connected up, coil 21 is first energized over: earth, $nk$-contact for reverse rotation, $u$-contact coil 21, battery, earth. After the $nk$-contact has been thrown over for reverse rotation and after the armature has been displaced a certain amount, coil 22 is connected to battery over: earth, $nk$-contact for reverse rotation, lower $u$-contact, coil 22, battery B, earth. When the two $u$-contacts are thrown over, the contact arrangement $nk$ for reverse rotation is disconnected and the contact device $nk$ for normal rotation consequently connected up in which case the coil 22 is energized first over: earth, $nk$-contact for normal rotation, lower $u$-contact, coil 22, battery B, earth.

Figure 13:
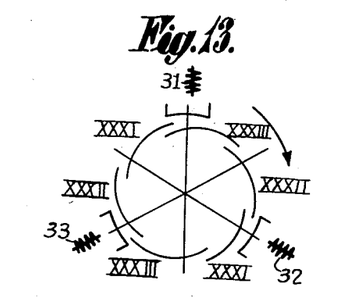
Figs. 13, 14 and 15 illustrate the contact arrangement for normal and reverse rotation for three pole motors.
Figure 14:
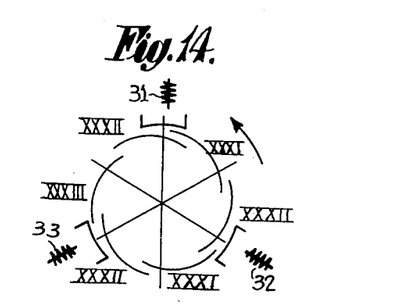
Figure 15:
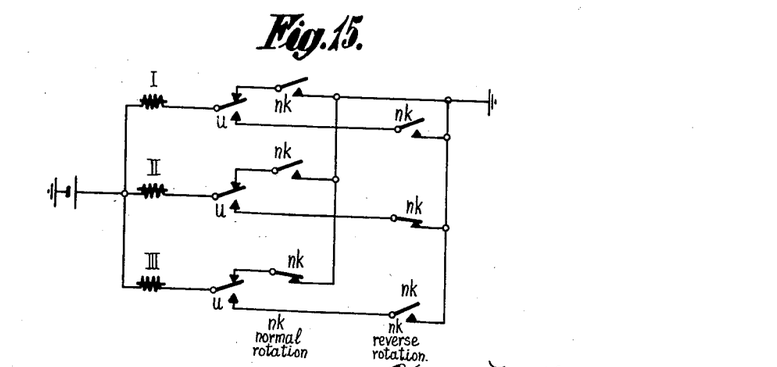

The method employed for three pole motors is similar to that described above as will be seen at a glance from Figs. 13, 14 and 15.

Figure 18:
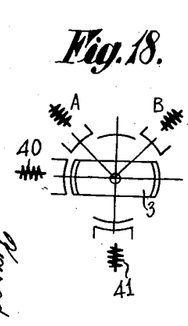
Figure 19:
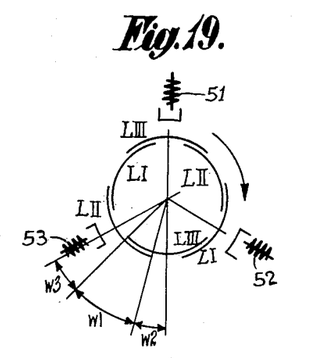
Figs. 19 to 22 inclusive show the energizing diagram for normal and reverse rotation as well as the circuit arrangement for motors with three magnets.

Whereas in the case of three pole motors with a two pole armature the starting in front of the centre of a pole is ensured without special measures, such special measures are necessary in the case of motors with two poles. A means known per se provided to ensure a reliable start consists of projections fitted on the armature which aid in throwing the armature into the same direction of rotation on each energization. Such an armature can also be used for normal and reverse operating motors. If, for example, the contact device controlling the direction of rotation is connected up the motor starts immediately. When the other contact device is switched on, the armature, when located for example in front of the centre of a pole, revolves first in the wrong direction until a cam contact re-energizes the pole in front of which the armature was located. The armature consequently is pushed back in the right direction of rotation and continues to run in this direction due to its momentum. While this solution of the problem is quite simple it, however, entails the disadvantage that the motor will not start in certain positions seldom occurring in ordinary practice but nevertheless having to be taken into consideration. With the object of avoiding the above mentioned drawback auxiliary poles are used according to the invention, being adapted to supersede the projections, thus ensuring a reliable start on the part of the armature whichever position it occupies. Such an arrangement is diagrammatically shown in Fig. 18. The armature 3, as shown, has no projections but can if required be provided with two such projections symmetrically arranged. The actual stator coils are represented by the reference characters 40 and 41 and the auxiliary coils by A and B. If the motor is required to run in normal clockwise direction the stator coil 40 is energized simultaneously with the auxiliary coil B and the coil 41 together with the auxiliary coil A. For reverse rotation the coil 41 is energized with B or 40 simultaneously with A.

Figure 16:
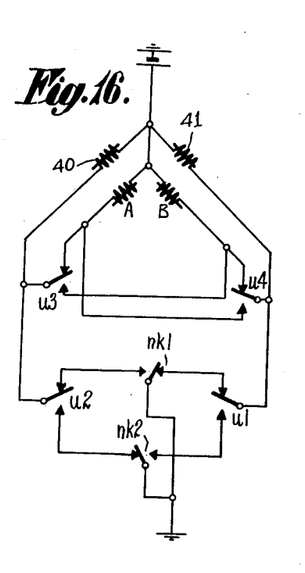
Figs. 16, 17 and 18 indicate means adopted to ensure a reliable start on the part of the motor.
Figure 17:
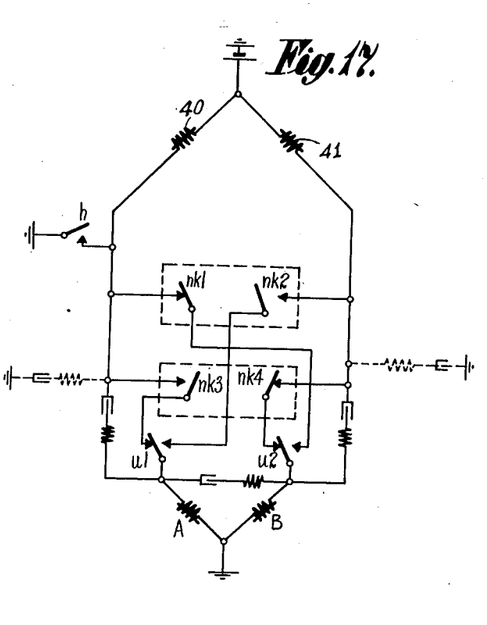

The auxiliary coils A and B may either be connected parallel with the stator coils 40 and 41 as shown in Fig. 16 or in series with said coils 40 and 41 (Fig. 17). If the auxiliary coils are connected up in parallel with the stator coils a larger number of switching over contacts is required than if connected in series. When the battery circuit according to Fig. 16 is closed the stator coil 41 is first energized over: earth, contact $nk1$, $u1$, stator coil 41 or over $u4$, auxiliary coil B, battery, back to earth. The stator coil 40 and the auxiliary coil A are energized in the same manner when contact $nk1$ is thrown over: earth, contacts $nk1$, $u2$, stator coil 40 or over $u3$, auxiliary coil A, battery, earth. Due to the throwing over of contacts $u1$—$4$ the motor changes its direction of rotation and in this case the stator coil 40 is first energized over: earth, contact $nk2$, $u2$, stator coil 40 or auxiliary coil B, battery, earth. The stator coil 41 is energized simultaneously with the auxiliary coil A in the following circuit when contact $nk2$ has been thrown over: earth, contacts $nk2$, $u1$, stator coil 41 or auxiliary coil A, battery, earth. The armature therefore revolves anti-clockwise prior to the switching over contacts being thrown over, but in a clockwise direction after the contacts $u1$—$4$ have been actuated.

If the auxiliary coils are connected in series with the stator coils according to the method indicated in Fig. 17 the following operations will take place: When the various contacts occupy the positions shown in the drawings the stator coil 41 is first energized in the following circuit when connected to battery: earth, auxiliary coil B, change over contact $u2$, cam contact $nk4$, stator coil 41, battery, earth. After the cam contact $nk4$ has opened and the cam contact $nk3$ closed, the stator coil 40 is energized over: earth, auxiliary coil A, change over contact $u1$, cam contact $nk3$, stator coil 40, battery, earth. Should it be required to change the direction of rotation of the motor, contacts $u1$ and $u2$ are thrown over, with the result that the cam contacts $nk1$ and $nk2$ are effective instead of contacts $nk3$ and $nk4$. When connected to battery the stator coil 40 is first energized instead of coil 41 in the following circuit: earth, auxiliary coil B, change over contact $u2$, cam contact $nk1$, stator coil 40, battery, earth. On opening contact $nk1$ and closing contact $nk2$ the stator coil 41 is energized over: earth, auxiliary coil A, contact $u1$, $nk2$, stator coil 41, battery, earth. The resistances and condensers shown in the circuit are mainly provided to prevent sparks. To stop the motor a contact $h$ has been provided which, when closed, causes the coil 40 to be permanently energized thus rapidly bringing the motor to rest.

Figure 20:
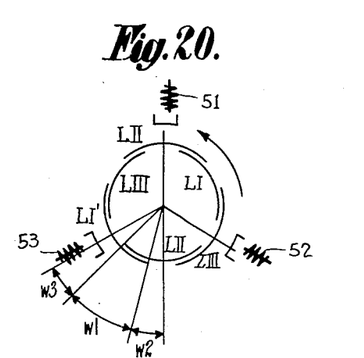
Figure 21:
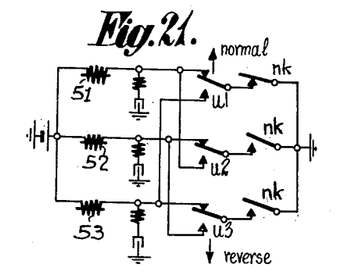
Figure 22:
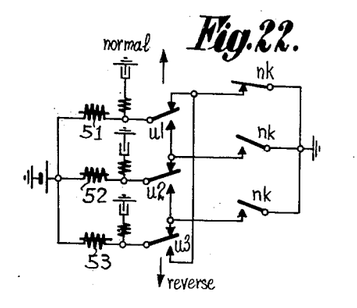

Figs. 19 to 25 inclusive illustrate devices which permit devices driven by an electric motor having three or more poles to run in normal or reverse, using one contact arrangement only and an energization lead. The angle of lap $w1$ in this case is made so large and symmetrical in relation to the magnet poles that a lead of equal size is obtained for both directions. The result is that the contact device ($nk$) sets up the lead and overlap necessary for continuous running so that, consequently, the motor has a satisfactory rotary momentum in any position and therefore starts reliably. Its direction of rotation may be reversed by changing the sequence in which the magnets are energized. The curve LIII (Fig. 19) for example shows the period during which the stator coil 53 is energized. This coil, however, is not actually de-energized when the armature has reached the position opposite the centre of the pole but at a certain angle $w3$ earlier. The sequence of the stator pole energization which determines the direction of rotation will be seen in Fig. 19 which shows normal rotation, Fig. 20 showing reverse rotation. The circuit associated therewith is to be seen in Figs. 21 and 22 of which Fig. 22 shows, in principle, the same circuit as Fig. 21, the only difference being that the leads from the coils terminate in the armature springs instead of front and back contacts of the change over contacts. If, according to Fig. 21 the change over switch is actuated so as to produce normal rotation, the stator coil 51 is first energized over: earth, contacts NK, $u1$, stator coil 51, battery, earth. The stator coil 52, after the armature has revolved a definite distance, is energized in the following circuit: earth, NK, $u2$, stator coil 52, battery, earth. When the armature has continued its rotation still further, the stator coil 53 will be energized over: earth, NK, $u3$, stator coil 53, battery, earth, and so forth. If the switch is now thrown over for the purpose of causing the motor to rotate in opposite direction, the stator coil 53 is first energized over: earth, NK, $u1$, stator coil 53, battery, earth. When the armature has rotated a certain distance in the opposite direction, NK is closed, causing the coil 52 to be energized over: earth, NK, $u3$, stator coil 52, battery, earth. After further rotation, NK is closed which causes the stator coil 51 to be energized over: earth, NK, $u2$, stator coil 51, battery, earth. The resistances and condensers shown in Figs. 21 and 22 are provided mainly for the purpose of quenching the sparks generated in the change over contacts.

Figure 23:
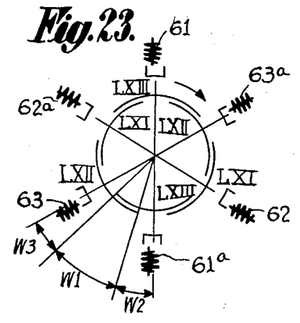
Figs. 23, 24 and 25 the same type of circuit for motors having six magnets.
Figure 24:
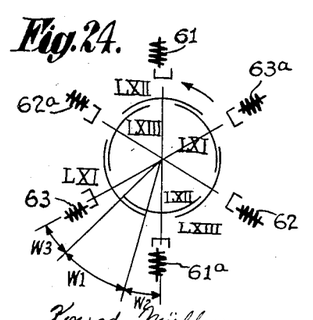
Figure 25:
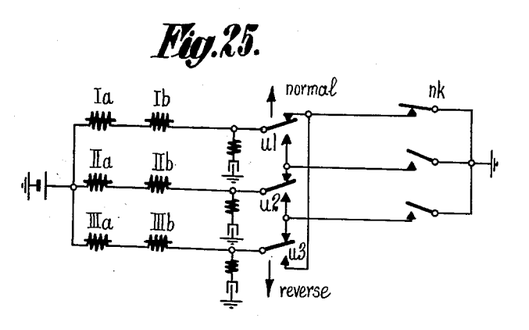

Figs. 23, 24 and 25 show an embodiment of an electric motor adapted to run in normal and reverse, utilizing one contact device only and having a stator comprising six stationary magnets set opposite each other which are series connected. The two diagrams in Figs. 23 and 24 show the sequence of their energization and also how the magnets are arranged whereas the circuit according to Fig. 25 is similar to that described in conjunction with Fig. 21.

Figure 26:
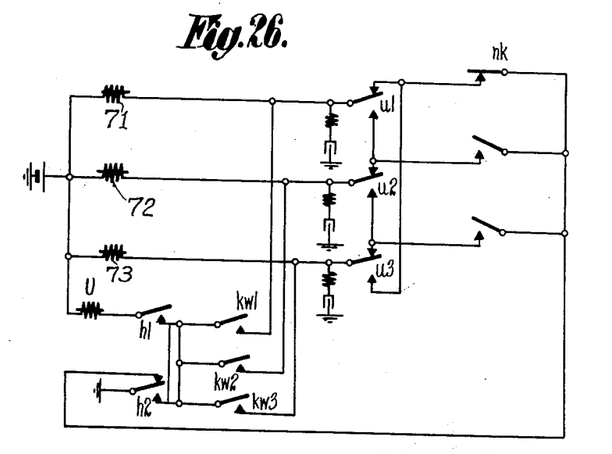
Fig. 26 shows a circuit arrangement in which special steps are taken to ensure a reliable stopping of the motor.

The devices illustrated in Fig. 26 are provided to ensure a reliable stopping on the part of the motor. In this case the armature controls a set of contact springs $kw1$—$3$ adapted to energize the winding of the pole in front of which the armature is to be stopped, over the stopping contact $h2$. Another stopping contact $h1$ is mechanically connected to the stopping contact $h2$. The stopping contact $h1$ connects up a circuit for a relay U which actuates the change over contacts $u$. When the motor is to be stopped, the stopping contact $h1$ and $h2$ are closed first. This energizes first the pair of magnets in front of which the armature is to stop and then the change over relay U. This relay throws over its contact $u1$ and $u3$ and thereby causes the armature to reverse its direction of rotation. This in turn acts as a powerful brake on the armature and increases the efficiency of the energized pole.

The stopping contact $h2$ may also be designed as an alternate contact and so adjusted that it is actuated later than $h1$, in this manner causing the potential to be withdrawn from the $nk$-contacts. The armature thereby is momentarily forced to reverse its direction of rotation whereas the holding winding only is energized in the succeeding period. The resistances and condensers in Figs. 25 and 26 are provided for quenching sparking at the contacts.

Figure 27:
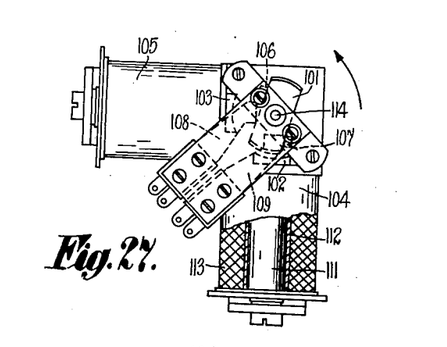
Fig. 27 shows a view of a driving device provided with two stationary electromagnets set at an angle of 90°.

A description will now be given of the driving device illustrated in Figs. 27, 28 and 29 in which the armature 101 is placed under the influence of the two magnet poles 102 and 103 of the stationary electromagnets 104 and 105. The alternate energization of these two magnets causes the armature to rotate and the direction in which it revolves is determined by the projections 106 and 107 on the armature. The energization of the two stator coils 104 and 105 is controlled by means of two sets of springs 108 and 109 which in turn are actuated by a cam face 110 mounted on the shaft of the armature. The electromagnet 104 is shown in part section so as to give a view of the copper winding 112 arranged on the core 111. This winding may consist of a copper slug, bare wire winding or the like. The reference numeral 113 represents the actual energizing winding of the coil 104. Instead of the short circuit winding taking the form of a copper slug or bare wire winding, a periodically short circuited winding may be used, for example short circuited during the starting or stopping of the motor.

Figure 28:
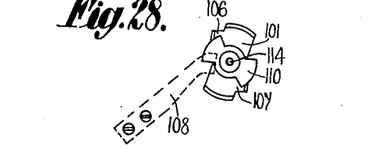
Fig. 28 represents the rotating members of the device shown in Fig. 27.

Fig. 28 shows the form of the cam face 110 for actuating the two sets of springs 108 and 109 which may be made of, for example fibre. It is mounted on the shaft 114 of the armature 101 and separates the two contact springs 108 and 109 from each other every time the projections of the fibre disc pass between them. Separating the two springs 108 de-energizes the coil 104 whereas the coil 105 is disconnected from battery when the springs 109 are parted.

Figure 29:
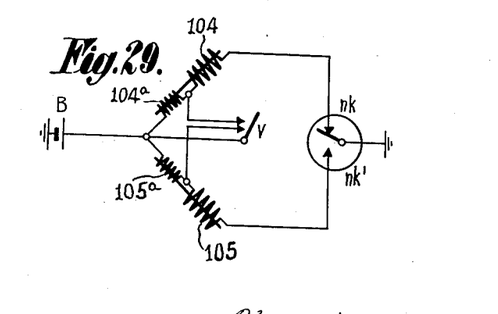
Fig. 29 shows the circuit arrangement for operating a device such as shown in Fig. 27.

Fig. 29 by way of example illustrates the circuit arrangement for the short circuit windings. The reference numerals 104 and 105 represent the stator coils of the driving device. When the contacts are placed in the position shown and battery is applied, a current passes first from earth over the cam contact $nk$, stator coil 104, winding 104a, battery, earth. Contact $nk'$ is closed as soon as the armature has moved a short distance. (The $nk$ contacts correspond to the contact springs 108 and 109 in Fig. 27 which are actuated by the cam face 110). This causes a circuit to be completed over: earth, contact $nk'$, stator coil 105, winding 105a, battery, earth. The motor continues to operate under the influence of the magnetic field generated by the windings 104 and 104a as well as 105 and 105a. If the motor is to be slowed down while hunting for an individual line, a not shown relay V actuates contact $v$ which short circuits both windings 104a and 105a. The circuit then extends as described above, with the difference, however, that windings 104a and 105a no longer assist in generating a magnetic field but operate as short circuit windings, thus influencing the magnetic field set up by windings 104 and 105 and slowing up the action when the motor starts or stops.

Figure 30:
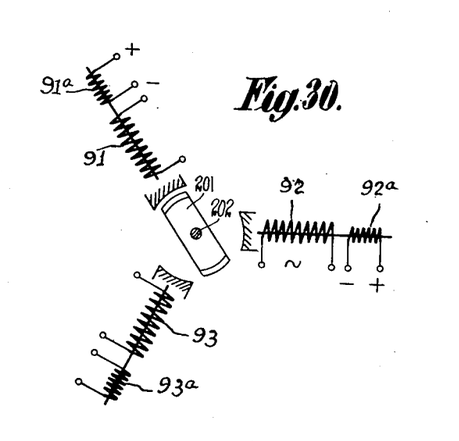
Fig. 30 shows diagrammatically an embodiment of a device driven by an electric motor provided with three stationary electromagnets.
Figure 31:
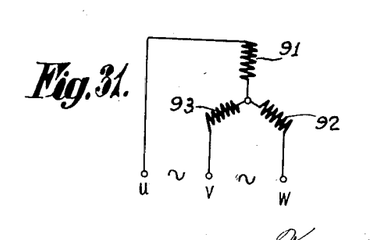
Fig. 31 shows the circuit for these three electromagnets.
Figure 32:
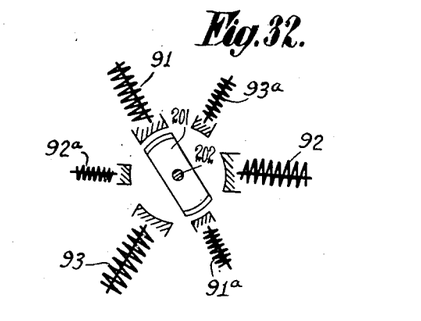
Fig. 32 shows diagrammatically an arrangement in which the auxiliary windings fitted to facilitate the stopping of the rotating members in the device are arranged on special poles provided for this purpose.

A description will now be given of the arrangement disclosed in Figs. 30, 31 and 32. The armature 201 of the driving means rotates on the shaft 202 and is suitably made of soft iron. The stator coils are represented by the reference numerals 91, 92 and 93. They are connected to an alternating current source of supply at the terminals $u$, $v$, $w$ in the manner indicated in Fig. 31. The cores of the stator coils 91, 92 and 93 serve at the same time for the auxiliary windings 91a, 92a and 93a which are also energized by direct current either passing through all the auxiliary windings simultaneously or one of these windings only. The energization of the auxiliary windings is controlled either by contact devices provided apart from the driving means or by switching means actuated by the motor shaft 202, for example, by connecting a wiper rigidly to the shaft 202 and causing it to brush over contact segments each one of which is associated with one of the auxiliary windings 91a, 92a, 93a. In such an arrangement one is in a position to stop the armature 201 of the driving means in front of any required pole by cutting off the direct current necessary for the stopping of the armature when, for example, the wiper reaches the contact segment associated with a definite auxiliary coil, for example, the auxiliary coil 91a.

According to Fig. 32 the auxiliary poles are arranged between the stator poles proper and in such a manner that the auxiliary pole always allocated to a definite stator coil is arranged on the opposite side of this stator coil so that consequently the sequence of the poles influencing the armature commencing with the stator pole 91 is as follows (clockwise): stator pole 91, auxiliary pole 93a, stator pole 92, auxiliary pole 91a, stator pole 93, auxiliary pole 92a. From the above it is seen that the coils 91, 92, and 93 are energized by alternating current while the auxiliary windings 91a, 92a, and 93a are energized by direct current and in order to insure that the motor is stopped in definite positions the auxiliary windings are arranged in the form of second windings on the stationary magnets on the same pole pieces as in Fig. 30, or on special auxiliary poles fitted between the stationary stator coils as in Fig. 32. The magnetic field generated by the auxiliary coils can be caused to influence the rotating members which are influenced by the stator coils or the auxiliary coils may be provided with a special armature suitably coupled to the main armature.

It is not absolutely essential to arrange the auxiliary windings on all the stator poles. They may be fitted to stator poles only in front of which the armature is required to stop.

We claim:

1. In an electric motor comprising stationary magnets having pole pieces and a rotor, switching means operated by the rotor for energizing said magnets in succession, said switching means causing energization of the next succeeding magnet pole before the preceeding magnet is deenergized.

2. An electric motor as claimed in claim 1, in which the rotor has an angular position before the pole of each magnet, said switching means causing energization of each succeeding magnet before the rotor reaches its angular position before the pole of that magnet.

3. In an electric motor, a rotor, operating magnets for moving the rotor, a switching device operated by the rotor for energizing the magnets in sequence, and electromagnetic means for varying the sequence in which the device energizes the magnets.

4. In an electric motor, a rotor, operating magnets for moving the rotor, a switching device operated by the rotor controlling the sequence of operating of the magnets, said rotor operable in both directions, and electromagnetic means for controlling its movement in each direction by said device.

5. In an electric motor, a rotor, operating magnets for moving the rotor, a circuit controller operated by the rotor for sequentially operating said magnets, switching means for controlling the magnets to rotate the rotor in either direction, said switching means and a circuit controller energizing the succeeding magnet before the preceding magnet is deenergized in both directions of movement of the rotor.

6. In an electric motor, a rotor, magnets for operating the rotor, a circuit controller operated by the motor for sequentially operating said magnets to move the rotor, auxiliary magnets for influencing the direction of the rotation of the rotor connected in series with the main magnets, and means for energizing the auxiliary magnets simultaneously with the main magnets.

7. An electric motor as claimed in claim 6, in which there is means for variably connecting the auxiliary magnets to the main magnets to change the direction of rotation.

8. In an electric motor, a rotor, stationary magnets for moving the rotor, means for energizing the magnets in sequence to move the rotor, auxiliary windings on said magnets, means for energizing said windings with the magnets to determine the direction of movement of the rotor, and means for energizing said auxiliary winding to facilitate stopping of the rotor.

KONRAD MÜLLER.
FRITZ DÖRING.
JOSEF WANTOSCH.